(12) United States Patent
Kodama et al.

(10) Patent No.: US 7,989,574 B2
(45) Date of Patent: Aug. 2, 2011

(54) CURABLE SILICONE RUBBER COMPOSITION AND CURED PRODUCT THEREOF

(75) Inventors: Kinya Kodama, Annaka (JP); Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 510 days.

(21) Appl. No.: 11/777,345

(22) Filed: Jul. 13, 2007

(65) Prior Publication Data

US 2008/0015326 A1  Jan. 17, 2008

(30) Foreign Application Priority Data

Jul. 14, 2006 (JP) .................................. 2006-194159

(51) Int. Cl.
*C08G 77/00* (2006.01)
(52) U.S. Cl. ............................... 528/43; 528/31; 528/32
(58) Field of Classification Search .................... 528/31, 528/32, 43
See application file for complete search history.

(56) References Cited

U.S. PATENT DOCUMENTS

| 2,676,182 | A | * | 4/1954 | Daudt et al. ................... 556/453 |
| 5,034,061 | A | * | 7/1991 | Maguire et al. ........... 106/287.14 |
| 2005/0006794 | A1 | | 1/2005 | Kashiwagi et al. |

FOREIGN PATENT DOCUMENTS

| JP | 6-37213 | 2/1994 |
| JP | 2000-198930 | 7/2000 |
| JP | 2000-336271 | 12/2000 |
| JP | 2001-2922 | 1/2001 |
| JP | 2005-42099 | 2/2005 |
| JP | 2005-307015 | 11/2005 |
| WO | WO 2005/054371 A2 | 6/2005 |

OTHER PUBLICATIONS

Office Action issued on Jan. 25, 2011 in the corresponding Japanese Patent Application No. 2006-194159 (with English Translation).

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

Provided is a curable silicone rubber composition, including: (A) an organopolysiloxane containing two or more silicon atom-bonded aliphatic unsaturated groups within each molecule, and containing a phenyl group and/or cyclohexyl group, (B) an organopolysiloxane resin with a three dimensional network structure consisting essentially of Q units and M units, and containing one or more phenyl groups and/or cyclohexyl groups, (C) an organohydrogenpolysiloxane, and (D) a platinum group metal-based catalyst, in which the component (B) exists in a quantity that represents from 20 to 80% by mass of the combination of the component (A) and the component (B), and in the component B, the quantity of low molecular weight substances, for which the weight average molecular weight measured by GPC and calculated against polystyrene standards is not greater than 500, is not greater than 5%. The composition is capable of forming a cured product with improved hardness, no surface tackiness, a high refractive index, and excellent resistance to thermal shock, without any loss in rubber-like properties such as elongation.

20 Claims, No Drawings

CURABLE SILICONE RUBBER COMPOSITION AND CURED PRODUCT THEREOF

BACKGROUND OF THE INVENTION

1. Field of the Invention

The present invention relates to an addition-curable silicone rubber composition and a cured product thereof, and relates particularly to a curable silicone rubber composition that produces a cured product with a superior refractive index, favorable rubber-like properties and strength characteristics, almost no surface tackiness, and a particularly superior resistance to thermal shock, as well as a cured product produced from such a composition.

2. Description of the Prior Art

Silicone rubber compositions exhibit excellent properties of weather resistance and heat resistance and the like, and form cured products with superior rubber-like properties such as hardness and elongation, and are consequently used in a wide variety of applications, but because they also exhibit surface tackiness, dust adhesion becomes a problem when such silicone rubber compositions are used as coating agents or the like for electrical or electronic components.

In the case of silicone varnishes that resolve this problem of surface tackiness, the occurrence of cracking becomes a problem. Furthermore, reduced hardness resins produced by adding a silicone oil to a silicone varnish are extremely brittle, and suffer from problems of reliability. A silicone rubber composition capable of forming a cured product with no surface tackiness and excellent crack resistance has been keenly sought for use as packaging for electrical and electronic components and the like. Furthermore, in the case of optical components and optical semiconductor elements and the like, increases in the refractive index are seen as a very desirable optical property.

In addition-curable silicone rubber compositions, the addition of a resin-like organopolysiloxane to improve the strength of the cured product is a commonly known technique. However, even in those cases where the strength of a cured product is raised by adding a resin-like organopolysiloxane, surface tackiness and dust adhesion remain problems.

As a result of previous intensive investigation, we have previously discovered an organopolysiloxane composition and a cured product thereof that are capable of resolving the problems outlined above. The cured product of this organopolysiloxane composition exhibits a dramatically higher resistance to thermal shock than high hardness silicone resins. However, in the case of packages of optical components or the like comprising two or more substances with different coefficients of linear expansion, although the composition exhibits its reflow temperature resistance (260° C. and 275° C.), the composition may not exhibit satisfactory resistance to thermal shock (resistance to heat cycling).

Accordingly, as a result of further intensive investigation, we discovered that by reducing the quantity of low molecular weight products incorporated within the organopolysiloxane, a resin with even superior resistance to thermal shock could be obtained.

Patent reference 1 discloses a sealing agent for an optical material containing a polyorganosiloxane as the base polymer, wherein the weight loss upon heating at 200° C. for one hour is not more than 1.5% by weight, but this sealing agent represents a different concept from the base polymer of the present invention, and furthermore, the above patent reference includes no disclosure regarding resolving the cracks that are generated under the thermal shock of heat cycling.

[Patent Reference 1] JP 2005-307015A

SUMMARY OF THE INVENTION

Accordingly, an object of the present invention is to provide an addition-curable silicone rubber composition that is capable of forming a cured product with improved hardness, no surface tackiness, a high refractive index, and excellent resistance to thermal shock, without any loss in rubber-like properties such as elongation, and also to provide a cured product of such a composition.

In order to achieve the above object, a first aspect of the present invention provides a curable silicone rubber composition, comprising:

(A) an organopolysiloxane containing two or more aliphatic unsaturated groups bonded to silicon atoms within each molecule, having a viscosity at 25° C. within a range from 500 to 500,000 mm$^2$/s, and containing either one of, or both, a phenyl group and a cyclohexyl group, (B) an organopolysiloxane resin with a three dimensional network structure, consisting essentially of $SiO_2$ units and $(R^1)_3SiO_{0.5}$ units (wherein, each $R^1$ represents, independently, a vinyl group, an allyl group, or a monovalent hydrocarbon group that contains no aliphatic unsaturated bonds, provided that one or more of all $R^1$ groups within this component (B) represent, independently, a phenyl group or a cyclohexyl group), (C) an organohydrogenpolysiloxane, and (D) a platinum group metal-based catalyst, wherein the component (B) exists in a quantity that represents from 20 to 80% by mass of the combination of the component (A) and the component (B), and within the component (B), the quantity of low molecular weight substances, for which the weight average molecular weight measured by gel permeation chromatography and calculated against polystyrene standards is not greater than 500, is not greater than 5%.

A second aspect of the present invention provides a cured product obtained by curing the above composition.

A third aspect of the present invention provides a method of sealing a semiconductor element with a cured product obtained by curing the above composition, comprising the steps of:

applying the composition to the semiconductor element, and curing the composition to form the cured product on top of the semiconductor element, thereby sealing the semiconductor element with the cured product.

A fourth aspect of the present invention provides a method of producing an optical material formed from a cured product obtained by curing the above composition, comprising the steps of molding and curing the composition, thereby producing the optical material.

According to the present invention, a cured product can be obtained that has a high refractive index, excellent resistance to thermal shock, and suffers no dust adhesion caused by the type of surface tackiness that represents a significant drawback of silicone elastomers. This cured product does not develop cracks as a result of thermal shock, even when used in a location that imparts considerable stress to the sealing resin, such as within a package comprising two or more substances with different coefficients of linear expansion, such as an optical component package, and consequently the composition of the present invention is very useful for sealing semiconductor elements such as optical semiconductor elements, and for optical materials.

DETAILED DESCRIPTION OF THE PREFERRED EMBODIMENTS

A more detailed description of the present invention is presented below. In the following description, "Me" represents a methyl group, "Vi" represents a vinyl group, and "Ph" represents a phenyl group.

[(A) Organopolysiloxane]

The component (A) that functions as the base component (the main component) of the silicone rubber composition of the present invention is an organopolysiloxane containing two or more aliphatic unsaturated groups such as alkenyl groups like vinyl groups or allyl groups bonded to silicon atoms within each molecule, having a viscosity at 25° C. within a range from 500 to 500,000 mm²/s, and containing either one of, or both, a phenyl group and a cyclohexyl group. Any organopolysiloxane that meets these criteria can be used as the component (A), although straight-chain diorganopolysiloxanes in which the principal chain consists of repeating diorganosiloxane units and both molecular chain terminals are blocked with triorganosiloxy groups are particularly desirable. From the viewpoints of the workability and curability of the composition of the present invention, the viscosity of the component (A) at 25° C. should be within a range from 500 to 500,000 mm²/s. The component (A) may use either a single organopolysiloxane, or a combination of two or more different organopolysiloxanes. The aliphatic unsaturated groups bonded to silicon atoms within the component (A) may be bonded to silicon atoms at the molecular chain terminals, to silicon atoms at non-terminal positions (within the molecular chain), or to both these types of silicon atoms, although organopolysiloxanes containing aliphatic unsaturated groups bonded to at least the silicon atoms at both molecular chain terminals are preferred, and the quantity of aliphatic unsaturated groups, relative to the total quantity of silicon atoms within the molecule, is typically within a range from 0.001 to 20 mol %, and is preferably from approximately 0.01 to 10 mol %.

Examples of preferred examples of the component (A) include the organopolysiloxanes represented by a general formula (1) shown below:

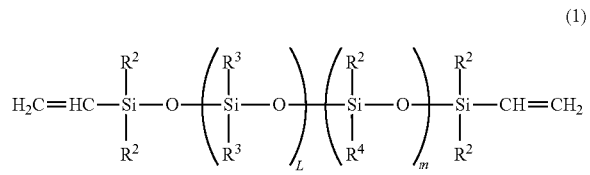

(wherein, $R^2$ represents identical or different, unsubstituted or substituted monovalent hydrocarbon groups, $R^3$ represents identical or different, unsubstituted or substituted monovalent hydrocarbon groups other than a phenyl group or cyclohexyl group, each $R^4$ represents, independently, a phenyl group or cyclohexyl group, and L and m each represent either 0 or a positive integer, provided that when m=0, at least one of all the $R^2$ groups is a phenyl group or a cyclohexyl group).

In the general formula (1), examples of $R^2$ include lower alkyl groups such as a methyl group, ethyl group, propyl group, or butyl group; cycloalkyl groups such as a cyclohexyl group; alkenyl groups such as a vinyl group or allyl group; aryl groups such as a phenyl group, tolyl group, or xylyl group; aralkyl groups such as a benzyl group; and groups in which a portion of, or all of, the hydrogen atoms within these hydrocarbon groups have been substituted with a halogen atom or a cyano group or the like, such as a chloromethyl group, cyanoethyl group, or 3,3,3-trifluoropropyl group. Of these, groups in which the number of carbon atoms is within a range from 1 to 10, and particularly from 1 to 6, are preferred.

Examples of $R^3$ include lower alkyl groups such as a methyl group, ethyl group, propyl group, or butyl group; cycloalkyl groups other than a cyclohexyl group, such as a cyclopentyl group; alkenyl groups such as a vinyl group or allyl group; aryl groups other than a phenyl group, such as a tolyl group or xylyl group; aralkyl groups such as a benzyl group; and groups in which a portion of, or all of, the hydrogen atoms within these hydrocarbon groups have been substituted with a halogen atom or a cyano group or the like, such as a chloromethyl group, cyanoethyl group, or 3,3,3-trifluoropropyl group. Of these, groups in which the number of carbon atoms is within a range from 1 to 10, and particularly from 1 to 6, are preferred, and a methyl group is particularly desirable.

In addition, L and m represent either 0 or a positive integer, and in particular, represent numbers that cause the viscosity of the component (A) at 25° C. to fall within the range described above. L and m are preferably integers that satisfy the formula: $0<L+m\leq 10{,}000$, even more preferably $8\leq L+m\leq 2{,}000$, and even more preferably $18\leq L+m\leq 1{,}200$, and moreover also satisfy the formula: $0\leq m/(L+m)\leq 1$, even more preferably $0.05\leq m/(L+m)\leq 0.8$, and even more preferably $0.1\leq m/(L+m)\leq 0.4$. However, when m=0, at least one of all the $R^2$ groups must represent a phenyl group or a cyclohexyl group.

Specific examples of the component (A) include the organopolysiloxanes represented by the formulas shown below, although the component (A) is not limited to these structures.

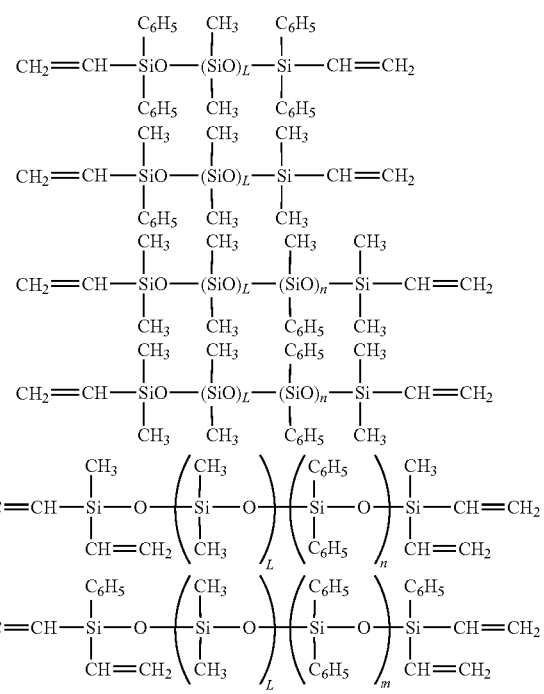

-continued

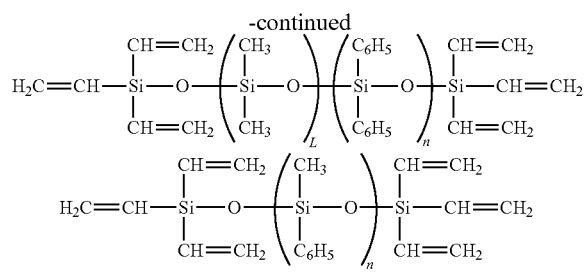

(In each of the above formulas, L and m are as defined above, and n represents a positive integer that is identical to m with the exception that it must satisfy the formula: $0<n/(L+n)\leq 1$.)

Furthermore, additional specific examples of the component (A) include organopolysiloxanes represented by formulas in which the phenyl groups ($C_6H_5$) within each of the above formulas have been substituted with cyclohexyl groups.

Conventional methods such as an equilibration polymerization method using alkali can be used to synthesize the organopolysiloxane of the component (A), and in such cases, energy balance within the product means that the low molecular weight substances generated are mainly cyclic materials.

These low molecular weight substances can be removed by conventional methods such as heat treatment or washing in alcohol, and by removing these low molecular weight substances, a silicone rubber composition can be obtained that produces a cured product with superior rubber-like properties and excellent resistance to thermal shock. Specifically, within the component (A), the quantity of low molecular weight substances for which the weight average molecular weight measured by gel permeation chromatography (namely, GPC) and calculated against polystyrene standards is not greater than 1,000 is preferably not greater than 5% (namely, from 0 to 5%), and is even more preferably 4% or less (namely, from 0 to 4%). In this description, the units "%" used in relation to the quantity of low molecular weight substances refer to "% by weight" as determined in the above GPC measurement.

[(B) Organopolysiloxane Resin with Resin Structure]

The component (B) is an organopolysiloxane resin with a resin structure (namely, a three dimensional network structure), consisting essentially of $SiO_2$ units (hereafter also referred to as a-units) and $(R^1)_3SiO_{0.5}$ units (wherein, each $R^1$ represents, independently, a vinyl group, an allyl group, or a monovalent hydrocarbon group that contains no aliphatic unsaturated bonds, provided that one or more of all the $R^1$ groups within this component (B), and preferably from 1 to 50 mol %, even more preferably from 3 to 30 mol %, and most preferably from 5 to 25 mol %, of all the $R^1$ groups within this component (B), represent, independently, a phenyl group or a cyclohexyl group) (hereafter also referred to as b-units). The component (B) is added to the composition of the present invention to improve the physical strength and surface tackiness of the cured product obtained from the composition. In the composition, the component (B) exists in a quantity that represents from 20 to 80% by mass of the combination of the component (A) and the component (B). Furthermore, in the component (B), the quantity of low molecular weight substances for which the weight average molecular weight measured by gel permeation chromatography and calculated against polystyrene standards is not greater than 500 is typically not greater than 5% (namely, from 0 to 5%), and is preferably 4% or less (namely, from 0 to 4%). If this quantity exceeds 5%, then the cured product produced from the obtained silicone rubber composition is more likely to exhibit inferior rubber-like properties, and the resistance to thermal shock tends to deteriorate. These low molecular weight substances can be removed by conventional methods such as heat treatment or washing in alcohol. Moreover, the weight average molecular weight of the component (B), measured by gel permeation chromatography and calculated against polystyrene standards, is preferably within a range from 1,000 to 50,000. The component (B) may use either a single compound, or a combination of two or more different compounds.

In those cases where $R^1$ is a monovalent hydrocarbon group that contains no aliphatic unsaturated bonds, specific examples of suitable groups include lower alkyl groups such as a methyl group, ethyl group, propyl group, or butyl group; cycloalkyl groups such as a cyclohexyl group; aryl groups such as a phenyl group, tolyl group, or xylyl group; aralkyl groups such as a benzyl group; and groups in which a portion of, or all of, the hydrogen atoms within these hydrocarbon groups have been substituted with a halogen atom or a cyano group or the like, such as a chloromethyl group, cyanoethyl group, or 3,3,3-trifluoropropyl group. Of these, groups in which the number of carbon atoms is within a range from 1 to 10, and particularly from 1 to 6, are preferred. Typically, the quantity of vinyl groups or allyl groups is within a range from 0 to 50 mol %, preferably from 1 to 30 mol %, and even more preferably from 3 to 20 mol %, of all the $R^1$ groups. The component (B) is preferably a vinyl group-containing or allyl group-containing organopolysiloxane with a resin structure.

The above units are preferably combined such that the value of the molar ratio b/a, which represents the quantity of b-units relative to the quantity of a-units, is within a range from 0.3 to 3, even more preferably from 0.5 to 1.5, and even more preferably from 0.7 to 1.0.

The component (B) can be synthesized easily by mixing together the source compounds that yield each of the units, in quantities that produce a value for the molar ratio b/a that falls within the aforementioned range, and then conducting a co-hydrolysis in the presence of acid, for example. Examples of source compounds for the a-units include sodium silicate, alkyl silicates, polyalkyl silicates, and silicon tetrachloride. Furthermore, examples of source compounds for the b-units include organosilicon compounds such as the triorganochlorosilanes and hexaorganodisiloxanes represented by the structural formulas shown below.

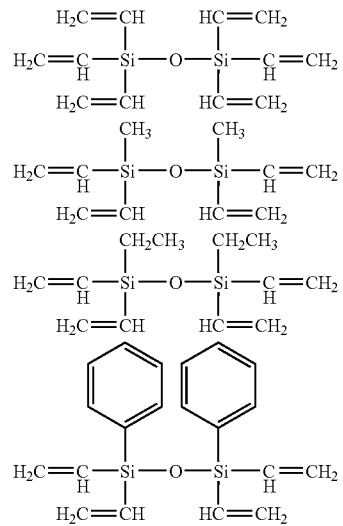

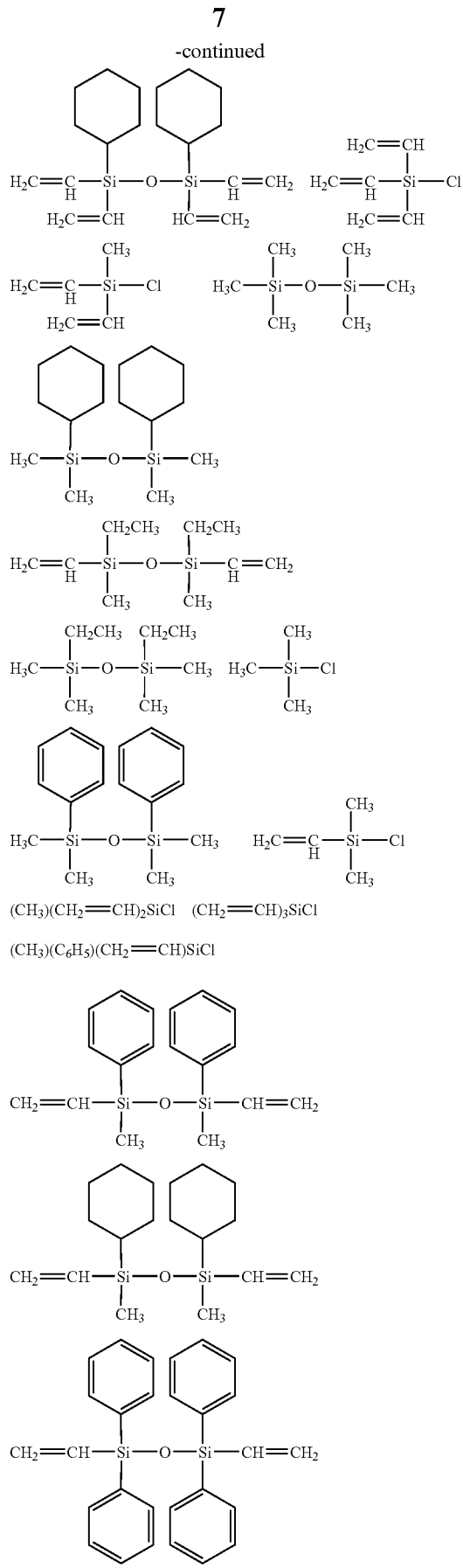

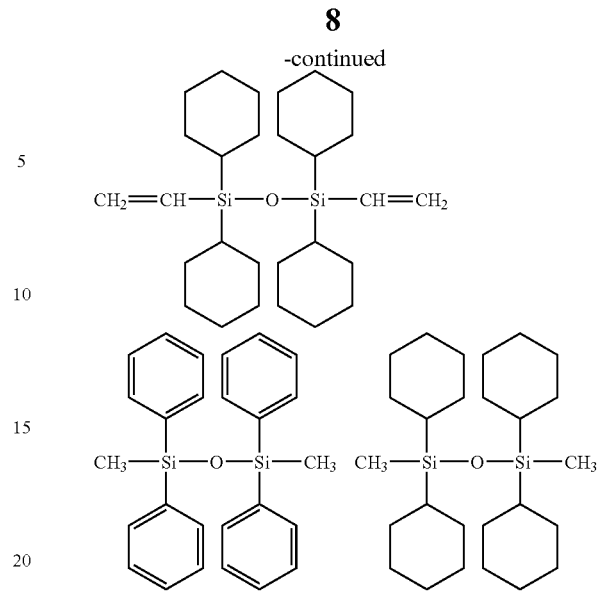

If the obtained composition contains large quantities of components formed by dimerization of the b-units (hereafter referred to as "dimer components"), then the crack resistance of the cured product of the composition during thermal shock testing tends to deteriorate, and consequently these dimer components are preferably removed as far as possible. Specifically, the quantity of dimer components preferably represents not more than 5% (from 0 to 5%), and preferably 4% or less (from 0 to 4%) of the entire component (B). Conventional methods such as heat treatment or washing in alcohol are ideal for removing these dimer components.

[(C) Organohydrogenpolysiloxane]

The organohydrogenpolysiloxane of the component (C) functions as a cross-linking agent. A cured product is formed from a composition of the present invention as a result of an addition reaction between the hydrogen atoms bonded to silicon atoms (SiH groups) within this component, the aliphatic unsaturated groups bonded to silicon atoms within the component (A), and where present, the vinyl groups and/or allyl groups bonded to silicon atoms within the component (B). The molecular structure of this component may be a straight-chain, branched-chain, cyclic, branched cyclic, or network-type structure. There are no particular restrictions on the positions of the SiH groups, and in those cases where the component (C) has molecular chain terminals, the SiH groups may exist solely at the molecular chain terminals, solely at non-terminal positions within the molecular chain, or at both of these positions. The component (C) may use either a single organohydrogenpolysiloxane, or a combination of two or more different organohydrogenpolysiloxanes.

Suitable examples of the component (C) include organohydrogenpolysiloxanes represented by an average composition formula (2) shown below:

$$H_c(R^5)_d SiO_{(4-c-d)/2} \qquad (2)$$

(wherein, $R^5$ represents identical or different, unsubstituted or substituted monovalent hydrocarbon groups that contain no aliphatic unsaturated bonds, and c and d are numbers that satisfy the formulas: $0.001 \leq c < 2$, $0.7 \leq d \leq 2$, and $0.8 \leq c+d \leq 3$), which contain at least two (typically from 2 to 300), and preferably 3 or more (for example, from 3 to 200, and particularly from 4 to approximately 100) SiH groups within each molecule.

In the above formula (2), examples of $R^5$ include identical or different, unsubstituted or substituted monovalent hydrocarbon groups which contain no aliphatic unsaturated bonds and contain from 1 to 10 carbon atoms, and particularly from 1 to 7 carbon atoms, and specific examples of suitable groups include all those groups other than the alkenyl groups described above in relation to the substituent group $R^2$ within the aforementioned general formula (1), including lower alkyl groups such as a methyl group and aryl groups such as a phenyl group.

Furthermore, c and d are numbers that satisfy the formulas: $0.001 \leq c < 2$, $0.7 \leq d \leq 2$, and $0.8 \leq c+d \leq 3$, and preferably satisfy the formulas: $0.05 \leq c \leq 1$, $0.8 \leq d \leq 2$, and $1 \leq c+d \leq 2.7$. The number of silicon atoms within the organohydrogenpolysiloxane of the component (C) is typically within a range from 2 to 300 atoms, preferably from 3 to 200 atoms, and is even more preferably from 4 to approximately 100 atoms.

Specific examples of the component (C) include pentamethyltrihydrogencyclotetrasiloxane, 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane, and dimethylsiloxane with both terminals blocked with trimethylsiloxy groups, copolymers of methylhydrogensiloxane, methylphenylsiloxane, and dimethylsiloxane with both terminals blocked with trimethylsiloxy groups, copolymers of methylhydrogensiloxane, dimethylsiloxane, and diphenylsiloxane with both terminals blocked with dimethylhydrogensiloxy groups, copolymers of methylhydrogensiloxane, dimethylsiloxane, and methylphenylsiloxane with both terminals blocked with dimethylhydrogensiloxy groups, copolymers comprising $(CH_3)_2HSiO_{1/2}$ units, $(CH_3)_3SiO_{1/2}$ units, and $SiO_{4/2}$ units, copolymers comprising $(CH_3)_2HSiO_{1/2}$ units and $SiO_{4/2}$ units, and copolymers comprising $(CH_3)_2HSiO_{1/2}$ units, $SiO_{4/2}$ units, and $(C_6H_5)_3SiO_{1/2}$ units.

The component (C) can normally be obtained either by hydrolysis of a chlorosilane such as $R^5SiHCl_2$, $(R^5)_3SiCl$, $(R^5)_2SiCl_2$ or $(R^5)_2SiHCl$ (wherein, $R^5$ is as defined above), or by equilibration of the siloxane obtained upon hydrolysis.

The blend quantity of the component (C) must be effective in curing the composition of the present invention, and the quantity of SiH groups within the component (C) is typically within a range from 0.1 to 4.0 mols, even more preferably from 1.0 to 3.0 mols, and most preferably from 1.2 to 2.8 mols, for each 1 mol of the combination of aliphatic unsaturated groups bonded to silicon atoms within the component (A), and where present, the vinyl groups and/or allyl groups bonded to silicon atoms within the component (B). Provided the blend quantity of the component (C) falls within this range, the curing reaction proceeds satisfactorily, enabling a silicone rubber cured product to be produced easily from the composition of the present invention, and moreover, the quantity of residual unreacted SiH groups within the cured product can be suppressed to a minimal quantity, meaning the cured product is more resistant to changes in the physical properties of the rubber over time.

[(D) Platinum Group Metal-Based Catalyst]

The platinum group metal-based catalyst of the component (D) is added to promote the addition curing reaction within the composition of the present invention, and may use either a single catalyst, or a combination of two or more different catalysts. Examples of the component (D) include platinum-based, palladium-based, and rhodium-based catalysts, although from the viewpoint of cost, platinum-based catalysts are particularly preferred, including $H_2PtCl_6 \cdot kH_2O$, $K_2PtCl_6$, $KHPtCl_6 \cdot kH_2O$, $K_2PtCl_4$, $K_2PtCl_4 \cdot kH_2O$, $PtO_2 \cdot kH_2O$, $PtCl_4 \cdot kH_2O$, $PtCl_2$ and $H_2PtCl_4 \cdot kH_2O$ (where in these formulas, k represents a positive integer), as well as complexes of these compounds with hydrocarbons, alcohols, or vinyl group-containing organopolysiloxanes.

The blend quantity of the component (D) need only be an effective catalytic quantity, and a preferred quantity, calculated as a mass of the platinum group metal relative to the combined mass of the components (A) to (D), is within a range from 0.1 to 500 ppm, and even more preferably from 0.5 to 200 ppm.

[Other Components]

In addition to the components (A) to (D) described above, if required, the composition of the present invention may also contain a variety of conventional additives. For example, reinforcing inorganic fillers such as fumed silica and fumed titanium dioxide, and non-reinforcing inorganic fillers such as calcium carbonate, calcium silicate, titanium dioxide, ferric oxide, carbon black and zinc oxide may be added to a composition of the present invention in quantities totaling not more than 600 parts by mass (namely, from 0 to 600 parts by mass, typically from 1 to 600 parts by mass, preferably from 10 to 400 parts by mass, and even more preferably from 10 to 100 parts by mass) per 100 parts by mass of the combination of components (A) to (D).

Furthermore, in order to improve the adhesiveness to the composition of the present invention, an adhesion assistant such as an organosilicon compound such as an organosilane or organopolysiloxane containing silicon atom-bonded alkoxy groups may be added as required to the composition as an optional component. Examples of these organosilicon compounds include alkoxysilane compounds such as tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, 3-glycidoxypropyltrimethoxysilane and 3-methacryloxypropyltrimethoxysilane, as well as siloxane compounds (organosiloxane oligomers) with straight-chain or cyclic structures of 4 to 30 silicon atoms, and preferably 4 to 20 silicon atoms, comprising at least two, and preferably either two or three, functional groups selected from the group consisting of a hydrogen atom bonded to a silicon atom (SiH group), alkenyl groups bonded to a silicon atom (such as a Si—CH═CH$_2$ group), alkoxysilyl groups (including trialkoxysilyl groups such as a trimethoxysilyl group) and epoxy groups (such as a glycidoxypropyl group or 3,4-epoxycyclohexylethyl group) within each molecule.

Furthermore, an organooxysilyl-modified isocyanurate compound represented by a general formula (3) shown below and/or a hydrolysis-condensation product thereof (an organosiloxane-modified isocyanurate compound) may also be used favorably as an adhesion assistant.

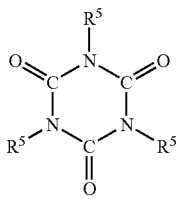
(3)

[wherein, each $R^5$ represents, independently, a silicon atom-containing organic group (an organooxysilylalkyl group) represented by a formula (4) shown below:

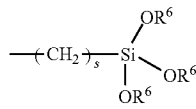
(4)

(wherein, each $R^6$ represents, independently, a hydrogen atom or a monovalent hydrocarbon group of 1 to 6 carbon atoms, and s represents an integer from 1 to 6, and preferably from 1 to 4),
or a monovalent hydrocarbon group containing an aliphatic unsaturated bond, provided that at least one of the $R^5$ groups is a silicon atom-containing organic group represented by the above formula (4)]

In those cases where $R^5$ represents a monovalent hydrocarbon group containing an aliphatic unsaturated bond, suitable examples include alkenyl groups of 2 to 8, and preferably 2 to 6 carbon atoms, such as a vinyl group, allyl group, propenyl group, isopropenyl group, butenyl group, isobutenyl group, pentenyl group, hexenyl group or cyclohexenyl group. Furthermore, in those cases where $R^6$ represents a monovalent hydrocarbon group, suitable examples include monovalent hydrocarbon groups of 1 to 8, and preferably 1 to 6 carbon atoms, including alkyl groups such as a methyl group, ethyl group, propyl group, isopropyl group, butyl group, isobutyl group, tert-butyl group, pentyl group or hexyl group; cycloalkyl groups such as a cyclohexyl group; alkenyl groups such as a vinyl group, allyl group, propenyl group or isopropenyl group; and aryl groups such as a phenyl group, although alkyl groups and cycloalkyl groups are preferred.

Specific examples of the above adhesion assistant include the compounds shown below.

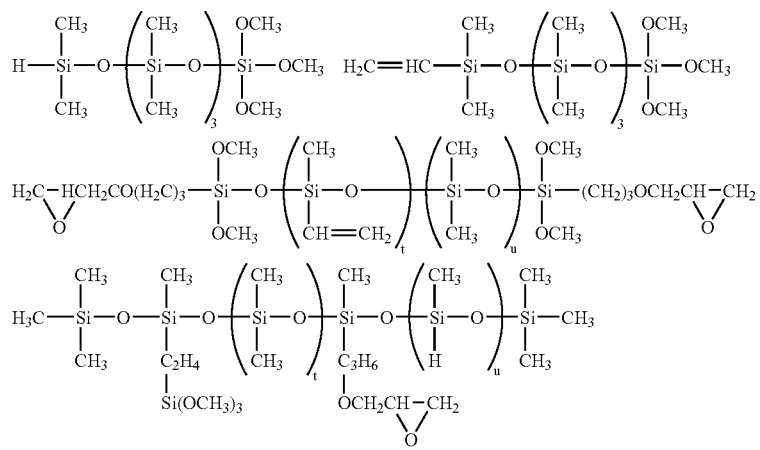

(wherein, t and u each represent an integer of 1 or greater, provided that t+u is within a range from 2 to 50, and preferably from 4 to 20)

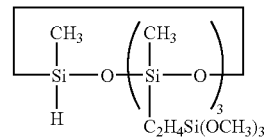

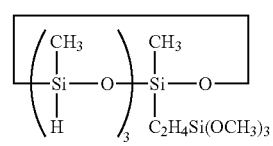

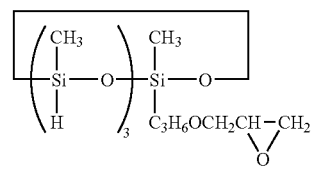

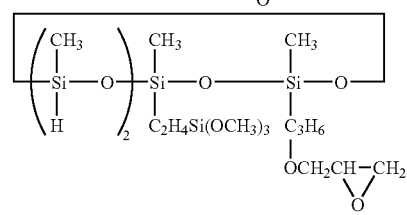

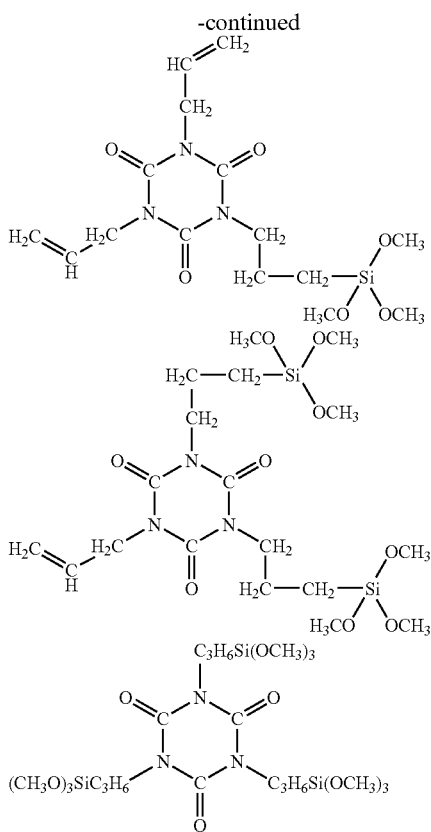

Of these types of organosilicon compounds, organosilicon compounds having a silicon atom-bonded alkoxy group and a silicon atom-bonded alkenyl group or silicon atom-bonded hydrogen atom (SiH group) within each molecule are preferred as they yield cured products with particularly superior adhesion.

In the present invention, the blend quantity of the above adhesion assistant that acts as an optional component is typically not more than 10 parts by mass (namely, from 0 to 10 parts by mass), and is preferably from 0.1 to 10 parts by mass, and even more preferably from 0.1 to 5 parts by mass, per 100 parts by mass of the combination of the component (A) and the component (B). If the blend quantity is too small, then the adhesion of the resulting cured product to substrates may be inferior. If the blend quantity is too large, then the object of the present invention may be unattainable, the hardness of the cured product may decrease, and adverse effects may be observed on the surface tackiness or transparency of the cured product.

Moreover, antioxidants such as BHT or vitamin B; conventional discoloration prevention agents such as organophosphorus-based discoloration prevention agents; light degradation prevention agents such as hindered amines; and coloring components and the like may also be added, provided such addition does not cause a departure from the object of the present invention.

[Preparation and Curing of Silicone Rubber Composition]

A silicone rubber composition of the present invention is prepared by mixing each of the above components uniformly together, although in order to ensure curing does not proceed, the composition is usually stored as two separate liquids, and these two liquids are then mixed together and cured at the time of use. Needless to say, a one-pot composition containing a small quantity of an added curing inhibitor such as acetylene alcohol is also possible.

A composition of the present invention can be applied to a predetermined substrate in accordance with the intended use, and subsequently cured. The curing conditions may be similar to those used for conventional addition reaction-curable silicone rubber compositions. For example, a composition of the present invention cures satisfactorily even at room temperature (25° C.), but if required, may also be cured by heating. If heating is used, the temperature is typically within a range from 60 to 200° C.

[Applications]

The composition of the present invention cures rapidly, using heating where required, and forms an elastic cured product that exhibits a high degree of hardness and no surface tackiness. The cured product can be used in a wide variety of applications where the adhesiveness of silicone cured products normally causes problems. Specifically, the cured product can be used as a protective coating agent, molding agent or lens material for electrical or electronic components and optoelectronic components, as well as for the potting, casting, injection molding, compression molding or transfer molding of such components. The composition of the present invention is particularly suitable for sealing semiconductor elements such as light-emitting or light-receiving optical semiconductor elements, transistors, diodes, ICs or solar cells or the like, and is particularly useful for sealing light-emitting or light-receiving optical semiconductor elements. Examples of these light-emitting or light-receiving optical semiconductor elements include LEDs, semiconductor lasers, photodiodes, and light-receiving phototransistors. Furthermore, as well as being able to be used as an optical material such as an optical waveguide, the composition of the present invention can also be used for coating, molding or bonding either semiconductor elements that are neither light-emitting nor light-receiving, or packaged members of semiconductor devices containing mounted semiconductor elements.

EXAMPLES

The present invention is described in further detail below using a series of examples and comparative examples, although the present invention is in no way limited by these examples. In the following examples, the units "parts" refer to "parts by mass", and viscosity values refer to values measured at 25° C.

Example 1

To (a) 50 parts of an organopolysiloxane (viscosity: 20,000 mm$^2$/s) represented by a formula shown below:

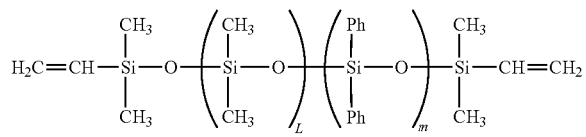

(wherein, L=413 and m=85)
were added (b) 50 parts of a resin-structure vinylphenylmethylpolysiloxane (PVMQ) consisting of 50 mol % of $SiO_2$ units, 42.5 mol % of $(CH_3)_3SiO_{0.5}$ units and 7.5 mol % of $MePhViSiO_{0.5}$ units, in which low molecular weight substances had been cut by alcohol washing, (c) a sufficient quantity of an organohydrogenpolysiloxane represented by a formula shown below to provide 1.5 mols of SiH groups for each 1 mol of silicon atom-bonded vinyl groups within the components (a) and (b) (hereafter, this ratio of SiH groups to vinyl groups may also be represented using the expression "SiH/SiVi"),

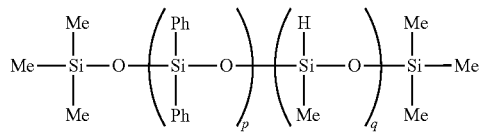

(wherein, p=2 and q=8)
and (d) 0.05 parts of an octyl alcohol-modified solution of chloroplatinic acid (platinum element content: 2% by mass), and the resulting mixture was then stirred thoroughly, yielding a silicone rubber composition.

The above component with a cut in the level of low molecular weight substances can be obtained by repeating an operation in which the above resin-structure vinylphenylmethylpolysiloxane is added to methanol as the alcohol, the resulting mixture is stirred for 1 hour at 25° C., and the alcohol is then removed by decantation. In this component with a cut in the level of low molecular weight substances, the quantity of low molecular weight substances for which the weight average molecular weight measured by gel permeation chromatography and calculated against polystyrene standards is not greater than 500 was 4%.

The above composition was then heat-molded for 4 hours at 150° C., thus forming a cured product. The refractive index of the cured product at 25° C. was measured using an Abbe refractometer, and the tensile strength, the hardness (the type D hardness), and the breaking elongation of the cured product were measured in accordance with JIS K 6249. The surface tackiness of the cured product was ascertained by finger touch. In addition, the cured product was placed in a sample of cotton dust, and following removal from the dust, was blown with compressed air to test whether the dust could be removed from the cured product surface. Moreover, a metal chip, specifically an iron chip (2 mm×2 mm×1 mm (thickness)), was bonded to the center of an alumina substrate (2 cm×2 cm×0.2 mm (thickness)) using an adhesive (product name: Aron Alpha, manufactured by Cemedine Co., Ltd.), and the chip was then sealed in a dome-shape using the above composition. The composition was then cured to form a sample. A heat resistance test was conducted by performing 3 repetitions of an operation in which the sample was left to stand at 260° C. for 3 minutes (between each repetition, the sample was left to stand at room temperature (25° C.) for 10 seconds), and the sample was then checked for the occurrence of cracking. Furthermore, a thermal shock test was conducted by subjecting the above sample to a hot-cold cycling process between −50° C. and 150° C. (which involved repeating a cycle of holding the sample at a temperature of −50° C. for 30 minutes and then allowing the sample to stand in a thermostatic chamber at 150° C. for 30 minutes), and the sample was then checked for the occurrence of cracking. The results of each of the measurements are shown in Table 1.

Example 2

To (a) 50 parts of an organopolysiloxane (viscosity: 4,000 mm²/s) represented by a formula shown below:

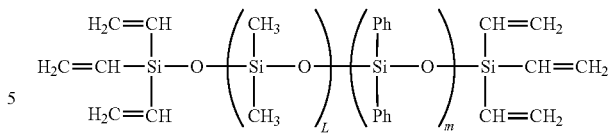

(wherein, L=70 and m=30)
were added (b) 50 parts of a resin-structure vinylphenylmethylpolysiloxane (PVMQ) consisting of 50 mol % of $SiO_2$ units, 35 mol % of $(CH_3)_3SiO_{0.5}$ units and 15 mol % of $MePhViSiO_{0.5}$ units, in which low molecular weight substances had been cut by alcohol washing, (c) a sufficient quantity of an organohydrogenpolysiloxane represented by a formula shown below to provide 1.5 mols of SiH groups for each 1 mol of vinyl groups within the components (a) and (b),

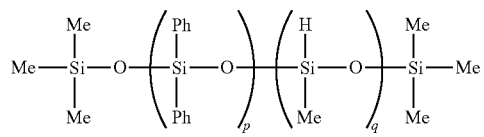

(wherein, p=4 and q=8)
and (d) 0.05 parts of an octyl alcohol-modified solution of chloroplatinic acid (platinum element content: 2% by mass), and the resulting mixture was then stirred thoroughly, yielding a silicone rubber composition. Using the same procedure as the example 1, cured products were then formed from this composition, and the physical properties of these cured products were measured. The results of each of the measurements are shown in Table 1.

The above component with a cut in the level of low molecular weight substances was obtained from the above resin-structure vinylphenylmethylpolysiloxane in the same manner as the example 1. In this component with a cut in the level of low molecular weight substances, the quantity of low molecular weight substances for which the weight average molecular weight measured by gel permeation chromatography and calculated against polystyrene standards is not greater than 500 was 3%.

Example 3

Using the same procedure as in the example 1, a component with a cut in the level of low molecular weight substances was obtained from the organopolysiloxane of the component (a) used in the example 1. In this component with a cut in the level of low molecular weight substances, the quantity of low molecular weight substances for which the weight average molecular weight measured by gel permeation chromatography and calculated against polystyrene standards is not greater than 1,000 was 5%. With the exception of using this component with a cut in the level of low molecular weight substances instead of the organopolysiloxane of the component (a), the same procedure as the example 1 was used to prepare a silicone rubber composition, form cured products from this composition, and then measure the physical properties of these cured products. The results of each of the measurements are shown in Table 1.

Example 4

Using the same procedure as in the example 1, a component with a cut in the level of low molecular weight substances was obtained from the organopolysiloxane of the component (a) used in the example 2. In this component with a cut in the level of low molecular weight substances, the quantity of low molecular weight substances for which the weight average molecular weight measured by gel permeation chromatography and calculated against polystyrene standards is not greater than 1,000 was 5%. With the exception of using this component with a cut in the level of low molecular weight substances instead of the organopolysiloxane of the component (a), the same procedure as the example 2 was used to prepare a silicone rubber composition, form cured products from this composition, and then measure the physical properties of these cured products. The results of each of the measurements are shown in Table 1.

Comparative Example 1

With the exception of replacing the component (b) from the example 1 (the resin-structure vinylphenylmethylpolysiloxane (PVMQ) in which low molecular weight substances had been cut by alcohol washing) with a resin-structure vinylphenylmethylpolysiloxane (PVMQ) consisting of 50 mol % of $SiO_2$ units, 42.5 mol % of $(CH_3)_3SiO_{0.5}$ units and 7.5 mol % of $MePhViSiO_{0.5}$ units (because the low molecular weight substances have not been cut by alcohol washing, the quantity of low molecular weight substances for which the weight average molecular weight measured by gel permeation chromatography and calculated against polystyrene standards is not greater than 500 was 12%), the same procedure as the example 1 was used to prepare a silicone rubber composition, form cured products from this composition, and then measure the physical properties of these cured products. The results of each of the measurements are shown in Table 2.

Comparative Example 2

With the exception of replacing the component (b) from the example 2 (the resin-structure vinylphenylmethylpolysiloxane (PVMQ) in which low molecular weight substances had been cut by alcohol washing) with a resin-structure vinylphenylmethylpolysiloxane (PVMQ) consisting of 50 mol % of $SiO_2$ units, 35 mol % of $(CH_3)_3SiO_{0.5}$ units and 15 mol % of $MePhViSiO_{0.5}$ units (because the low molecular weight substances have not been cut by alcohol washing, the quantity of low molecular weight substances for which the weight average molecular weight measured by gel permeation chromatography and calculated against polystyrene standards is not greater than 500 was 10%), the same procedure as the example 2 was used to prepare a silicone rubber composition, form cured products from this composition, and then measure the physical properties of these cured products. The results of each of the measurements are shown in Table 2.

Comparative Example 3

Using a commercially available silicone varnish (product name: KJR-632, manufactured by Shin-Etsu Chemical Co., Ltd.), and using the same procedure as the example 1, cured products were formed by curing the varnish, and the physical properties of these cured product were measured. The results of each of the measurements are shown in Table 2.

TABLE 1

| | Example | | | |
|---|---|---|---|---|
| | 1 | 2 | 3 | 4 |
| SiH/SiVi | 1.5 | 1.5 | 1.5 | 1.5 |
| Curing conditions | 150° C./4 hours | 150° C./4 hours | 150° C./4 hours | 150° C./4 hours |
| Refractive index | 1.46 | 1.50 | 1.46 | 1.50 |
| Hardness (type D) | 17 | 20 | 16 | 20 |
| Breaking elongation (%) | 30 | 30 | 35 | 35 |
| Tensile strength (MPa) | 3 | 3 | 3 | 3 |
| Dust adhesion due to surface tackiness | No | No | No | No |
| Heat resistance test (260° C./3 min., 3 repetitions) | No cracking | No cracking | No cracking | No cracking |
| Thermal shock test (−50° C. to 150° C., 500 cycles) | No cracking | No cracking | No cracking | No cracking |

TABLE 2

| | Comparative Example | | |
|---|---|---|---|
| | 1 | 2 | 3 |
| SiH/SiVi | 1.5 | 1.5 | 1.5 |
| Curing conditions | 150° C./4 hours | 150° C./4 hours | 150° C./4 hours |
| Refractive index | 1.41 | 1.41 | 1.51 |
| Hardness (type D) | 15 | 18 | 80 |
| Breaking elongation (%) | 30 | 30 | — |
| Tensile strength (MPa) | 3 | 3 | — |
| Dust adhesion due to surface tackiness | No | No | No |
| Heat resistance test (260° C./3 min., 3 repetitions) | No cracking | No cracking | No cracking |
| Thermal shock test (−50° C. to 150° C., 500 cycles) | Cracking after 200 cycles | Cracking after 200 cycles | Cracking after 50 cycles |

What is claimed is:

1. A curable silicone rubber composition, comprising:
   (A) an organopolysiloxane containing two or more aliphatic unsaturated groups bonded to silicon atoms within each molecule, having a viscosity at 25° C. within a range from 500 to 500,000 mm$^2$/s, and containing either one of, or both, a phenyl group and a cyclohexyl group,
   (B) an organopolysiloxane resin with a three dimensional network structure, consisting essentially of SiO$_2$ units and $(R^1)_3SiO_{0.5}$ units wherein, each $R^1$ represents, independently, a vinyl group, an allyl group, or a monovalent hydrocarbon group that contains no aliphatic unsaturated bonds, provided that 7.5 to 25 mol% of all $R^1$ groups within this component (B) represent, independently, a phenyl group,
   (C) an organohydrogenpolysiloxane, and
   (D) a platinum group metal-based catalyst, wherein
   said component (B) exists in a quantity that represents from 20 to 80% by mass of a combination of said component (A) and said component (B), and within said component (B), a quantity of low molecular weight substances, for which a weight average molecular weight measured by gel permeation chromatography and calculated against polystyrene standards is not greater than 500, is not greater than 5%.

2. The composition according to claim 1, wherein said component (A) is a straight-chain diorganopolysiloxane.

3. The composition according to claim 1, wherein said component (A) is represented by a general formula (1) shown below:

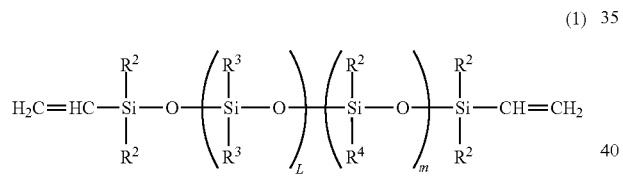

(1)

(wherein, $R^2$ represents identical or different, unsubstituted or substituted monovalent hydrocarbon groups, $R^3$ represents identical or different, unsubstituted or substituted monovalent hydrocarbon groups other than a phenyl group or cyclohexyl group, each $R^4$ represents, independently, a phenyl group or a cyclohexyl group, and L and m each represent either 0 or a positive integer, provided that when m=0, at least one of all $R^2$ groups is a phenyl group or a cyclohexyl group).

4. The composition according to claim 1, wherein within said component (A), a quantity of low molecular weight substances, for which a weight average molecular weight measured by gel permeation chromatography and calculated against polystyrene standards is not greater than 1,000, is not greater than 5%.

5. The composition according to claim 1, wherein, within said component (B), the molar ratio of said $(R^1)_3SiO_{0.5}$ units to said SiO$_2$ units is within a range from 0.3 to 3.

6. A cured product obtained by curing the composition according to claim 1.

7. A method of sealing a semiconductor element with a cured product obtained by curing the composition according to claim 1, comprising the steps of:
   applying said composition to said semiconductor element, and
   curing said composition to form said cured product on top of said semiconductor element, thereby sealing said semiconductor element with said cured product.

8. The method according to claim 7, wherein said semiconductor element is an optical semiconductor element.

9. A method of producing an optical material formed from a cured product obtained by curing the composition according to claim 1, comprising the steps of molding and curing said composition, thereby producing said optical material.

10. The composition according to claim 1, wherein at least 10% of all of the organic groups bonded to the silicon atoms of the organopolysiloxane (A) are phenyl groups, and 7.5-25 mol% of all $R^1$ groups represent a phenyl group in the (B) organopolysiloxane resin.

11. A curable silicone rubber composition, comprising:
    (A) an organopolysiloxane containing two or more aliphatic unsaturated groups bonded to silicon atoms within each molecule, having a viscosity at 25° C. within a range from 500 to 500,000 mm$^2$/s, and containing either one of, or both, a phenyl group and a cyclohexyl group,
    (B) an organopolysiloxane resin with a three dimensional network structure, consisting essentially of SiO$_2$ units and $(R^1)_3SiO_{0.5}$ units wherein, each $R^1$ represents, independently, a vinyl group, an allyl group, or a monovalent hydrocarbon group that contains no aliphatic unsaturated bonds, provided that 7.5 to 50 mol% of all $R_1$ groups within this component (B) represent, independently, a phenyl group,
    (C) an organohydrogenpolysiloxane, and
    (D) a platinum group metal-based catalyst, wherein
    said component (B) exists in a quantity that represents from 20 to 80% by mass of a combination of said component (A) and said component (B), and within said component (B), a quantity of low molecular weight substances, for which a weight average molecular weight measured by gel permeation chromatography and calculated against polystyrene standards is not greater than 500, is not greater than 5%.

12. The composition according to claim 11, wherein said component (A) is a straight-chain diorganopolysiloxane.

13. The composition according to claim 11, wherein said component (A) is represented by formula (1) shown below:

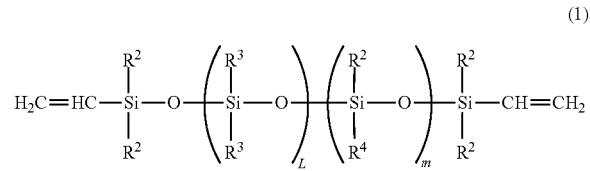

(1)

wherein, $R^2$ represents identical or different, unsubstituted or substituted monovalent hydrocarbon groups, $R^3$ represents identical or different, unsubstituted or substituted monovalent hydrocarbon groups other than a phenyl group or cyclohexyl group, each $R^4$ represents, independently, a phenyl group or a cyclohexyl group, and L and m each represent either 0 or a positive integer, provided that when m =0, at least one of all $R^2$ groups is a phenyl group or a cyclohexyl group.

14. The composition according to claim 11, wherein within said component (A), a quantity of low molecular weight substances, for which a weight average molecular weight measured by gel permeation chromatography and calculated against polystyrene standards is not greater than 1,000, is not greater than 5%.

15. The composition according to claim 11, wherein, within said component (B), the molar ratio of said $(R^1)_3SiO_{0.5}$ units to said $SiO_2$ units is within a range from 0.3 to 3.

16. A cured product obtained by curing the composition according to claim 11.

17. A method of sealing a semiconductor element with a cured product obtained by curing the composition according to claim 11, comprising:
   applying said composition to said semiconductor element, and
   curing said composition to form said cured product on top of said semiconductor element, thereby sealing said semiconductor element with said cured product.

18. The method according to claim 17, wherein said semiconductor element is an optical semiconductor element.

19. A method of producing an optical material formed from a cured product obtained by curing the composition according to claim 11, comprising:
   molding and curing said composition, thereby producing said optical material.

20. The composition according to claim 11, wherein at least 10% of all of the organic groups bonded to the silicon atoms of the organopolysiloxane (A) are phenyl groups and 7.5-25 mol% of all $R^1$ groups represent a phenyl group in the (B) organopolysiloxane resin.

* * * * *